United States Patent [19]
Suzuki et al.

[11] Patent Number: 6,077,809
[45] Date of Patent: Jun. 20, 2000

[54] METHOD FOR THE PREPARATION OF A HIGH-POROSITY ADSORBENT LOADED WITH CRYSTALLINE HYDROUS ZIRCONIUM OXIDE

[75] Inventors: Toshishige Suzuki, Tagajo; Hideyuki Matsunaga; Toshiro Yokoyama, both of Sendai, all of Japan

[73] Assignee: Japan as represented by Director General of Agency of Industrial Science and Technology, Japan

[21] Appl. No.: 09/107,317

[22] Filed: Jun. 30, 1998

[30] Foreign Application Priority Data

Jul. 3, 1997 [JP] Japan ................................. 9-193280

[51] Int. Cl.[7] .......................... B01J 20/00; B01J 20/26; B01J 23/00; C01B 7/00; C08J 30/10
[52] U.S. Cl. ........................ 502/400; 502/401; 502/402; 502/349; 423/240; 524/413; 524/421; 523/205; 523/210; 442/121; 526/95; 526/107; 526/118; 526/119
[58] Field of Search ..................... 502/400, 402, 502/401, 349; 423/240; 524/413, 431; 523/205, 210; 442/121; 526/95, 107, 118, 119

[56] References Cited

U.S. PATENT DOCUMENTS

| | | | |
|---|---|---|---|
| 2,467,089 | 4/1949 | Marisic et al. | 502/349 |
| 3,334,962 | 8/1967 | Clearfield | 23/34 |
| 4,362,626 | 12/1982 | Takeuchi et al. | 210/670 |
| 5,141,634 | 8/1992 | Carr et al. | 210/198.2 |
| 5,681,880 | 10/1997 | Desor et al. | 524/320 |

FOREIGN PATENT DOCUMENTS

| | | |
|---|---|---|
| 2-211244 | 8/1990 | Japan . |
| 8-71415 | 3/1996 | Japan . |

*Primary Examiner*—Mark L. Bell
*Assistant Examiner*—Patricia L. Hailey
*Attorney, Agent, or Firm*—Wenderoth, Lind & Ponack, L.L.P.

[57] ABSTRACT

A novel high-porosity adsorbent material for selective adsorption of fluoride ions, arsenic ions and phosphate ions as well as a method for the preparation thereof are disclosed. The adsorbent material consists of a porous carrier material such as crosslinked polyacrylate resin beads and a crystalline hydrous zirconium oxide impregnating the pores of the carrier in the monoclinic or cubic crystal form. The adsorbent material is prepared by soaking the carrier material with an alcohol solution of a zirconium compound such as zirconium oxychloride to impregnate the pores with the zirconium compound, followed by hydrolysis of the zirconium compound with an aqueous alkaline solution to convert the same into zirconium hydroxide and subjecting the carrier material impregnated with zirconium hydroxide to a hydrothermal reaction under specific conditions to convert the zirconium hydroxide into crystalline hydrous zirconium oxide which has a monoclinic or cubic crystal form depending on the acidity or alkalinity of the aqueous medium employed in the hydrothermal treatment.

13 Claims, 1 Drawing Sheet

METHOD FOR THE PREPARATION OF A HIGH-POROSITY ADSORBENT LOADED WITH CRYSTALLINE HYDROUS ZIRCONIUM OXIDE

BACKGROUND OF THE INVENTION

The present invention relates to a method for the preparation of a high-porosity adsorbent loaded with crystalline hydrous zirconium oxide that can selectively adsorb ions of fluoride, arsenic, phosphate and the like from an aqueous medium.

It is reported in Inorganic Chemistry, volume 3, page 146 (1964) that crystalline hydrous zirconium oxide can be obtained by a heat treatment of the hydrous zirconium oxide formed by the hydrolysis reaction of a zirconium salt using an alkali.

It is also reported in Inorganic Ion Exchange Materials, CRC Press, page 141 (1981) that the hydrous zirconium oxide prepared in the above described manner is a stable compound hardly soluble in any acids, alkalis and organic solvents and hardly susceptible to oxidation and reduction and exhibits a specific ion exchange behavior to adsorb fluoride, arsenic and phosphate ions selectively from an aqueous medium.

Since the hydrous zirconium oxide obtained by the above mentioned method is usually in the form of a fine powder, difficulties are encountered in handling thereof when the powder is intended to be employed in a specific ion exchange process involving adsorption and desorption of the ions and regeneration of the adsorbent.

In order to overcome the above mentioned disadvantages of the conventional hydrous zirconium oxide, a proposal is made in Japanese Patent Kokai 2-211244 for a method of obtaining hydrous zirconium oxide supported on a porous carrier material by a method in which, for example, a porous resin is impregnated with a tetraalkoxy zirconium which is subjected to an in situ hydrolysis reaction to be converted into hydrous zirconium oxide as supported on the carrier material. This method, however, involves a practical disadvantage that, if not to mention the expensiveness of the tetraalkoxy zirconium used as the starting material, the hydrous zirconium oxide formed by the hydrolysis reaction of a tetraalkoxy zirconium is in an amorphous form so that the hydrous zirconium oxide is easily leaked out of the pores of the carrier material resulting in a limited durability of the adsorbent material not to allow repeated use.

Another proposal is made in Japanese Patent Kokai 8-71415 for the preparation of an ion exchange resin-based adsorbent material in which zirconium ions are supported on a cation exchange resin by using an aqueous solution of a zirconium compound. This method is also defective because, since the zirconium ions are supported on the cation exchange resin by bringing the ion exchange resin into contact with an aqueous solution of a zirconium compound to effect an ion exchange reaction, the amount of zirconium ions supported on the ion exchange resin is inevitably limited and, as a consequence of the low temperature at the thermal treatment which is 100° C. or lower, the hydrous zirconium oxide is in an amorphous form or has a low degree of crystallinity so as to be readily eluted out of the supporting ion exchange resin.

SUMMARY OF THE INVENTION

The present invention accordingly aims to provide an efficient method for the preparation of an adsorbent loaded with crystalline hydrous zirconium oxide in a high loading and with remarkable resistance against leaking from the supporting carrier material to ensure good durability of the adsorbent material with stable adsorption capacity.

Thus, the method of the present invention for the preparation of a high-porosity adsorbent loaded with crystalline hydrous zirconium oxide comprises the steps of:

(a) bringing a porous carrier material having pores into contact with an alcohol solution containing a zirconium compound selected from zirconium oxychloride $ZrOCl_2$ and zirconium oxynitrate $ZrO(NO_3)_2$ so as to impregnate the pores of the porous material with the alcohol solution;

(b) drying the porous material to give a porous carrier material loaded with the zirconium compound by evaporation of the alcohol;

(c) bringing the dried porous material into contact with an aqueous alkaline solution to hydrolyze the zirconium compound; and (d) subjecting the porous material supporting the hydrolyzed zirconium compound to a hydrothermal reaction at a temperature in the range from 100° C. to 180° C.

The hydrous zirconium oxide thus formed has a specific crystalline form either monoclinic or cubic depending on the acidity or alkalinity condition of the aqueous medium upon the hydrothermal reaction in step (d).

DETAILED DESCRIPTION OF THE PREFERRED EMBODIMENTS

Figure 1:
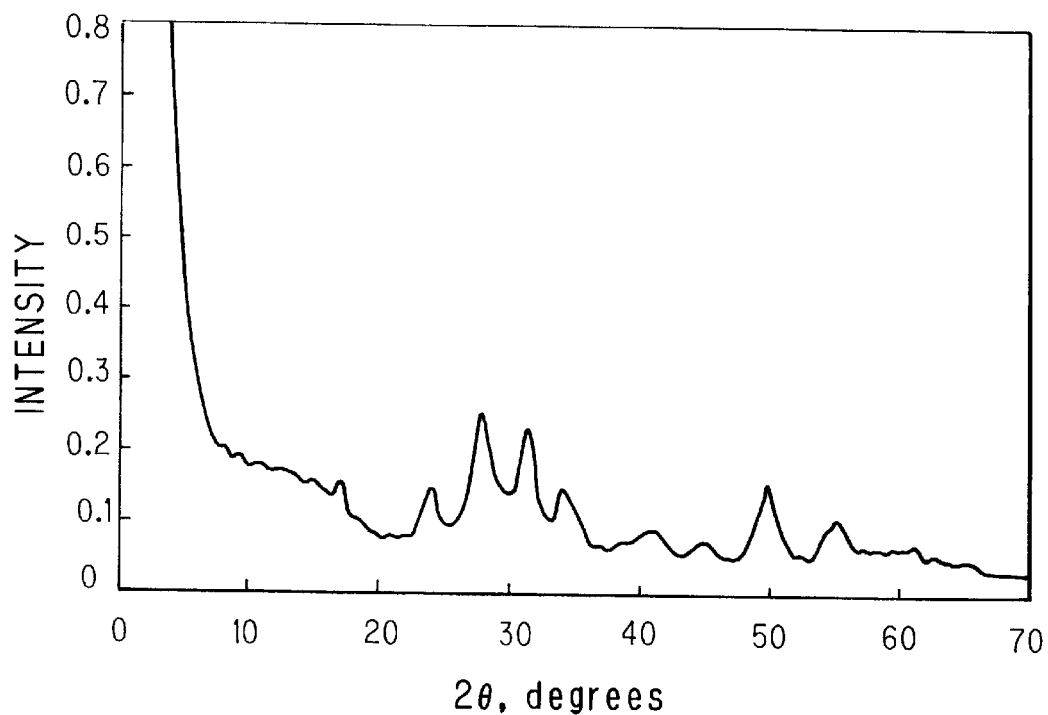
FIGS. 1 and 2 are the X-ray diffraction patterns of the adsorbents prepared in Examples 1 and 2, respectively.

The zirconium compound as the starting material of the inventive method is zirconium oxychloride or zirconium oxynitrate. These compounds can be used either singly or as a combination of both. The zirconium compound can be either an anhydrous compound or a hydrated compound. The alcoholic solvent used in the preparation of a solution of the zirconium compound is not particularly limitative provided that the zirconium compound can be dissolved in the alcohol and the alcohol can be readily removed by evaporation. The alcohol is preferably a lower alcohol such as methyl, ethyl and propyl alcohols, of which methyl alcohol is particularly preferable with respect to the solubility of the zirconium compound therein and easiness to remove by evaporation.

The porous carrier material is also not particularly limitative and can be selected from high-porosity materials conventionally used as a carrier of various kinds of adsorbent materials. Suitable high-porosity materials include porous polymeric resins obtained from a composite of a resin and readily removable filler particles by dissolving away the filler particles, porous ion exchange resins, foamed bodies of a polystyrene, polyurethane resin or phenolic resin, crosslinked polyacrylate resins and crosslinked polystyrene resins as well as activated carbons, of which crosslinked polyacrylate resins and crosslinked polystyrene resins are particularly preferable. Though not particularly limitative, the high-porosity carrier material is preferably in the form of particles or beads of a particle size in the range from 20 mesh to 200 mesh in the Tyler standard and should have a specific surface area in the range from 50 to 800 m²/g and an average pore diameter in the range from 1 to 10 nm.

In practicing the method of the present invention, a high-porosity carrier material is brought into contact with an alcohol solution of a zirconium compound such as zirconium oxychloride and zirconium oxynitrate so as to impregnate the pores of the carrier material with the zirconium compound. Thus, the carrier material, optionally, after a drying treatment and the alcohol solution of the zirconium compound are blended and the carrier material soaked with the alcohol solution is then freed from the alcohol by evaporation under reduced pressure. The drying treatment of the carrier material before soaking with the alcohol solution can be omitted unless the moisture content therein is unduly high. The concentration of the zirconium compound in the alcohol solution should desirably be as high as possible or close to saturation because the amount of the zirconium compound supported by the carrier material can be increased so much.

In the next place, the thus obtained high-porosity carrier material impregnated with the zirconium compound and freed from the alcoholic solvent is subjected to a hydrolysis reaction of the zirconium compound with an alkaline compound by bringing the carrier material impregnated with the zirconium compound into contact with an aqueous solution of an alkaline compound such as sodium hydroxide, potassium hydroxide and ammonia, though not particularly limitative thereto, so that the zirconium compound is hydrolyzed and converted into zirconium hydroxide hardly soluble in water, which is deposited in the pores of the high-porosity carrier material. The concentration of the alkaline compound in the aqueous alkaline solution is usually in the range from 10 to 40% by weight. The hydrolysis reaction proceeds at an increased rate as the concentration of the alkaline compound is increased. It is not always necessary to conduct the hydrolysis reaction at an elevated temperature since the reaction can proceed at a moderate rate even at room temperature. The hydrolysis reaction usually takes 3 hours or more though widely dependent on the concentration of the alkaline compound and the reaction temperature.

A further step to follow the above described hydrolysis reaction is a hydrothermal treatment of the carrier material impregnated with zirconium hydroxide in the pores in an aqueous medium at a high temperature so that the zirconium hydroxide is immobilized in the pores by crystallization into the form of a hydrous zirconium oxide. It is preferable that the hydrothermal treatment is conducted in a slightly acidic or alkaline aqueous medium. The hydrothermal reaction is conducted at a temperature in the range from 100 to 180° C. for at least 3 hours or, preferably, for 8 to 20 hours or, preferably, at a temperature in the range from 140 to 160° C. for at least 15 hours in a corrosion-resistant autoclave under a superatmospheric pressure.

The crystal form of the thus formed crystalline hydrous zirconium oxide can be different depending on the acidity or alkalinity of the aqueous medium in which the hydrothermal treatment is undertaken. When the aqueous medium is slightly acidic, for example, having a pH of 1 to 4 with an acid, the hydrous zirconium oxide uniquely takes a monoclinic crystal form. Whereas the aqueous medium is as alkaline as containing from 0.1 to 5 moles/liter or more of an alkaline compound such as alkali metal hydroxides and ammonia, the crystals of the hydrous zirconium oxide in the pores are predominantly cubic. The acid to acidify the aqueous medium is preferably an inorganic acid such as hydrochloric acid and sulfuric acid and the alkaline compound to alkalify the aqueous medium is preferably sodium hydroxide or potassium hydroxide, though not particularly limitative thereto. Further, the selectivity in the adsorption of various ions can be different between the monoclinic and cubic crystal forms prepared by controlling the acidity or alkalinity of the aqueous medium in the hydrothermal treatment.

As is described above, the present invention provides an efficient method for the preparation of a high-performance adsorbent material for fluoride, arsenic and phosphate ions starting with inexpensive materials to have crystalline hydrous zirconium oxide as the active substance supported in a large amount on a high-porosity carrier material from which elution of zirconium is negligibly small.

The adsorbent material obtained according to the method of the present invention is useful for adsorption of fluoride ions, phosphate ions and pentavalent or tervalent arsenic ions. The form of the high-porosity carrier material from which the adsorbent material is prepared can be selected depending on the particularly intended application of the adsorbent material. When fine spherical resin particles are used as the carrier material, for example, the adsorbent material prepared therefrom has utilizability as the stationary phase in the ion-exchange chromatography.

In the following, the method of the present invention for the preparation of the adsorbent material is described in more detail by way of Examples which, however, never limit the scope of the invention in any way. Example 1

To a solution prepared by dissolving 44 g (0.13 mole) of zirconium oxychloride octahydrate $ZrOCl_2.8H_2O$ in 250 ml of methyl alcohol were added 35 g of beads of a crosslinked acrylic resin. The resin beads after washing and drying had a particle size distribution of 50 to 100 mesh and specific surface area of 470 $m^2/g$. After standing for 30 minutes under a reduced pressure, the mixture was subjected to distillation under reduced pressure to remove the methyl alcohol so that dried resin beads impregnated with the zirconium compound were obtained. In the next place, the resin beads were transferred into a glass flask to which 100 ml of 28% ammonia water were added followed by standing for 3 hours at room temperature. Thereafter, the supernatant was discarded and the resin beads were washed with water by 3 times of repeated decantation. The thus washed resin beads were added to and suspended in 100 ml of water which was acidified with hydrochloric acid to pH 2.0.

In the next place, the suspension of the resin beads in a slightly acidic medium was transferred into an autoclave and heated therein at 150° C. for 15 hours to effect the hydrothermal reaction. After cooling, the resin beads were collected by filtration and washed successively first with water and then with ethyl alcohol followed by drying at 50° C. under reduced pressure to give 48 g of resin beads impregnated with crystalline hydrous zirconium oxide and having a specific surface area of 373 $m^2/g$ suitable as an adsorbent material. The content of zirconium in this material was 23% by weight.

FIG. 1 of the accompanying drawing shows an X-ray diffraction diagram of this material with the Cu Kα line which clearly supports the characterization that the zirconium oxide in the thus obtained adsorbent material had a monoclinic crystal form. Example 2

To a solution prepared by dissolving 44 g (0.13 mole) of zirconium oxychloride octahydrate $ZrOCl_2.8H_2O$ in 250 ml of methyl alcohol were added 35 g of the same crosslinked acrylic resin beads as used in Example 1 after washing and drying and, after standing for 30 minutes under a reduced pressure, the mixture was subjected to evaporation under reduced pressure to remove the methyl alcohol so that dried resin beads impregnated with the zirconium compound were obtained. In the next place, the resin beads were transferred into a glass flask to which 200 ml of a 30% by weight aqueous solution of sodium hydroxide were added followed by heating for 8 hours under reflux. Thereafter, the resin beads were collected by filtration and washed successively first with water and then with ethyl alcohol followed by drying at 50° C. under reduced pressure to give 49 g of resin beads impregnated with the zirconium compound. The content of zirconium in this material was 20% by weight.

Figure 2:
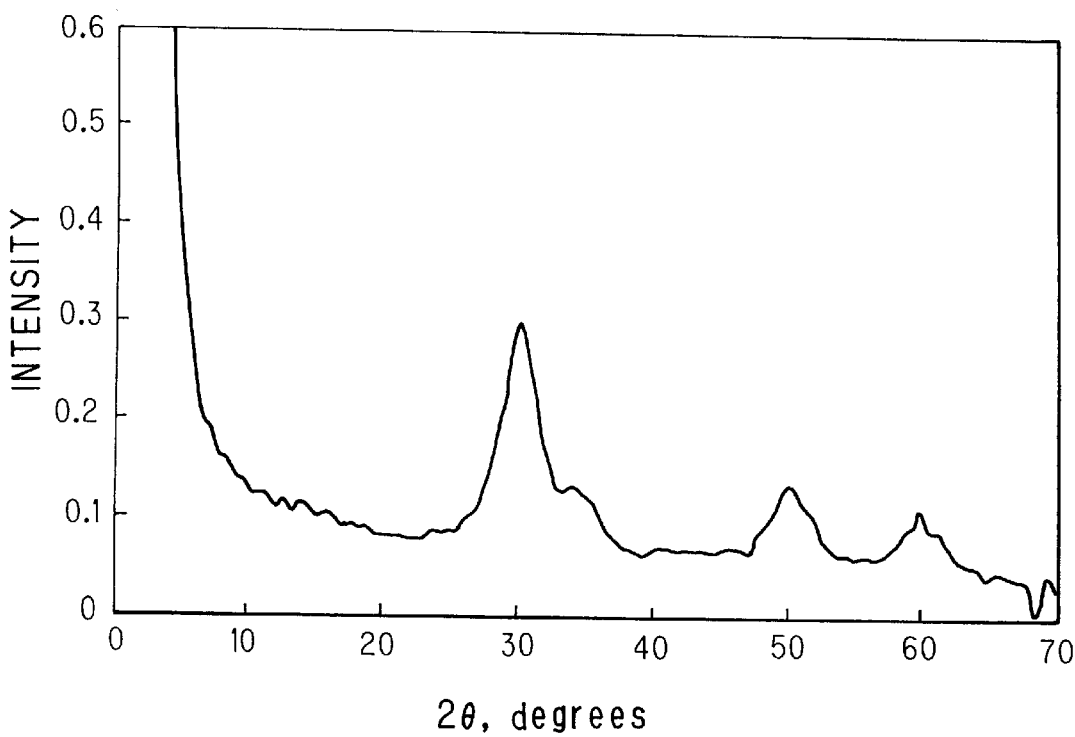

FIG. 2 of the accompanying drawing shows an X-ray diffraction diagram of this material which clearly supported the characterization that the zirconium oxide in the thus obtained adsorbent material had a cubic crystal form.

Example 3

To a solution prepared by dissolving 44 g (0.13 mole) of zirconium oxychloride octahydrate $ZrOCl_2.8H_2O$ in 250 ml of methyl alcohol were added 35 g of beads of an anion exchange resin (Lewattit MP500WS, a product by Baeyer Co.) after drying and, after standing for 30 minutes under a reduced pressure, the mixture was subjected to distillation under reduced pressure to remove the methyl alcohol so that dried resin beads impregnated with the zirconium compound were obtained. Then, the resin beads were transferred into a glass flask to which 100 ml of 28% ammonia water were added followed by standing for 3 hours at room temperature. Thereafter, the supernatant was discarded and the resin beads were washed with water by 3 times repetition of decantation. The thus washed resin beads were added to and suspended in 100 ml of water which was acidified with hydrochloric acid to a pH of 2.0.

In the next place, the suspension of the resin beads in a slightly acidic medium was transferred into an autoclave and heated therein at 150° C. for 15 hours to effect the hydrothermal reaction. After cooling, the resin beads were collected by filtration and washed successively first with water and then with ethyl alcohol followed by drying at 50° C. under reduced pressure to give 49 g of resin beads impregnated with crystalline hydrous zirconium oxide. The content of zirconium in this material was 12.2% by weight.

Application Example 1

A glass column having an inner diameter of 1 cm was filled with 5 g of the adsorbent material prepared in Example 1 having a wet volume of 14.5 ml followed by washing with acidified water of pH 3.0. Thereafter, an aqueous solution containing sodium fluoride in a concentration of 100 ppm by weight calculated as fluoride ions and having a pH of 3.0 was passed through the column at a flow rate of 2 ml/minute under periodical determination of the fluoride ion concentration in the effluent out of the column to obtain a result that the fluoride ion concentration in the effluent was lower than 1 ppm even after completion of passing of the sodium fluoride solution in a volume corresponding to 50 times of the resin volume and remained below 10 ppm until passing of the sodium fluoride solution in an overall volume corresponding to 70 times of the resin volume.

Application Example 2

A 1 mole/liter aqueous solution of sodium hydroxide in a volume of 200 ml was passed through the column containing the adsorbent resin beads after the adsorption test of fluoride ions in Application Example 1 at a flow rate of 2 ml/minute and the effluent out of the column was collected and analyzed for the fluoride ions to find that the effluent contained 97% of the fluoride ions estimatedly adsorbed on the adsorbent resin beads in Application Example 1 while practically no zirconium could be detected in the effluent.

In the next place, an aqueous hydrochloric acid solution having a pH of 1.0 was passed through the same column in such an overall volume that the effluent out of the column had reached a pH of 1.0 at the end followed by washing of the resin beads with water. Thereafter, the same sodium fluoride solution as prepared and used in Application Example 1 was passed through the column in the same manner to give substantially the same results of fluoride ion adsorption as in Application Example 1

Application Example 3

A buffered aqueous solution at pH 5.0 containing 10 ppm of As(V) ions was continuously passed through a glass column containing 2 g of the adsorbent resin beads prepared in Example 1 at a flow rate of 0.5 ml/minute. The effluent solution coming out of the column was taken in fractions, of which the concentration of As(V) ions was monitored with 0.1 ppm as the critical limit in compliance with the regulation of the Japanese industrial effluent standard.

It was found that the As(V) ions could be retained so efficiently on the adsorbent resin beads that the feed solution in a volume as large as 1000 times or more of the adsorbent resin volume could be passed through the column without leakage of the As(V) ions. The overall amount of the As(V) ions retained on the adsorbent resin was approximately 35 mg per g of the adsorbent resin at the breakthrough point.

The As(V) ions retained on the adsorbent resin could be released from the resin by elution with a 1 mole/liter aqueous solution of sodium hydroxide. The procedure of elution was so sharp that that more than 98% of the As(V) ions retained on the adsorbent resin were contained in the eluate solution in a volume of only 6 times of the adsorbent resin volume. This meant that almost 200 times enrichment of the As(V) ions could be accomplished in the eluate solution as compared with the starting feed solution.

The adsorbent-loaded column could be repeatedly used for at least 5 times without noticeable decrease in the performance of adsorption and desorption of As(V) ions by subjecting the adsorbent resin to a regeneration treatment by washing with water, rinse with a 0.2M acetate buffer solution of pH 4.2 and further washing with water. Loss of zirconium by leakage was negligibly small by repeating the cycles of adsorption, desorption and regeneration.

What is claimed is:

1. A method for the preparation of a high-porosity adsorbent loaded with crystalline hydrous zirconium oxide which comprises the steps of:

(a) bringing a porous carrier material having pores, wherein said porous carrier material is selected from the group consisting of crosslinked polyacrylate resins and crosslinked polystyrene resins, into contact with an alcohol solution containing a zirconium compound selected from the group consisting of zirconium oxychloride $ZrOCl_2$ and zirconium oxynitrate $ZrO(NO_3)_2$ so as to impregnate the pores of the porous carrier material with the alcohol solution;

(b) drying the porous carrier material to give a porous material loaded with the zirconium compound by evaporation of the alcohol;

(c) bringing the dried porous material into contact with an aqueous alkaline solution to effect hydrolysis of the zirconium compound; and (d) subjecting the porous material loaded with the hydrolyzed zirconium compound to a hydrothermal reaction in an aqueous medium at a temperature in the range from 100° C. to 180° C.

2. The method for the preparation of a high-porosity adsorbent loaded with crystalline hydrous zirconium oxide as claimed in claim 1 in which the alcohol in the alcohol solution of the zirconium compound is methyl alcohol.

3. The method for the preparation of a high-porosity adsorbent loaded with crystalline hydrous zirconium oxide as claimed in claim 1 in which the porous carrier material has a specific surface area in the range from 50 to 800 $m^2/g$ and an average pore diameter in the range from 1 to 10 nm.

4. The method for the preparation of a high-porosity adsorbent loaded with crystalline hydrous zirconium oxide as claimed in claim 1 in which the concentration of the zirconium compound in the alcohol solution is close to saturation.

5. The method for the preparation of a high-porosity adsorbent loaded with crystalline hydrous zirconium oxide as claimed in claim 1 in which the aqueous alkaline solution is selected from the aqueous solutions of sodium hydroxide, potassium hydroxide or ammonia as an alkaline compound.

6. The method for the preparation of a high-porosity adsorbent loaded with crystalline hydrous zirconium oxide as claimed in claim 5 in which the concentration of the alkaline compound in the aqueous alkaline solution is in the range from 10% to 40% by weight.

7. The method for the preparation of a high-porosity adsorbent loaded with crystalline hydrous zirconium oxide as claimed in claim 1 in which the hydrolysis reaction in step (c) is conducted for at least 3 hours.

8. The method for the preparation of a high-porosity adsorbent loaded with crystalline hydrous zirconium oxide as claimed in claim 1 in which the hydrothermal reaction in step (d) is conducted at a temperature in the range from 140 to 180° C.

9. The method for the preparation of a high-porosity adsorbent loaded with crystalline hydrous zirconium oxide as claimed in claim 1 in which the hydrothermal reaction in step (d) is conducted for a time in the range from 8 to 20 hours.

10. The method for the preparation of a high-porosity adsorbent loaded with crystalline hydrous zirconium oxide as claimed in claim 1 in which the aqueous medium in the hydrothermal reaction in step (d) is acidic having a pH in the range from 1 to 4.

11. The method for the preparation of a high-porosity adsorbent loaded with crystalline hydrous zirconium oxide as claimed in claim 1 in which the aqueous medium in the hydrothermal reaction in step (d) is alkaline containing an alkaline compound in a concentration in the range from 0.1 to 5 moles/liter.

12. A high-porosity adsorbent material for selective adsorption of fluoride ions, arsenic ions and phosphate ions which comprises:

(A) a porous carrier material having pores, wherein said porous carrier material is selected from the group consisting of crosslinked polyacrylate resins and crosslinked polystyrene resins; and (B) a crystalline hydrous zirconium oxide of a monoclinic crystal form impregnating the pores of the porous carrier material.

13. A high-porosity adsorbent material for selective adsorption of fluoride ions, arsenic ions and phosphate ions which comprises:

(A) a porous carrier material having pores, wherein said porous carrier material is selected from the group consisting of crosslinked polyacrylate resins and crosslinked polystyrene resins; and (B) a crystalline hydrous zirconium oxide of a cubic crystal form impregnating the pores of the porous carrier material.

\* \* \* \* \*